United States Patent [19]
Maier

[11] 4,057,164
[45] Nov. 8, 1977

[54] ELECTRICAL OUTLET BOX MOUNTING

[76] Inventor: William Maier, 125 Lawlor Terrace, Stratford, Conn. 06497

[21] Appl. No.: 659,893

[22] Filed: Feb. 20, 1976

[51] Int. Cl.² ............................................. H02G 3/12
[52] U.S. Cl. .................................... 220/3.6; 174/57; 174/58; 220/3.7; 220/3.92; 248/DIG. 6
[58] Field of Search .................. 220/3.2, 3.3, 3.4, 3.5, 220/3.6, 3.7, 3.8, 3.9, 3.92, 3.94; 174/57, 58; 248/221 D, 221 F, DIG. 6

[56] References Cited

U.S. PATENT DOCUMENTS

| | | | |
|---|---|---|---|
| 2,399,491 | 4/1946 | Lindstrom | 220/3.6 |
| 2,473,051 | 6/1949 | Carlson | 220/3.6 X |
| 2,512,188 | 6/1950 | Wait et al. | 220/3.9 X |
| 3,633,782 | 1/1972 | Bellinger | 220/3.5 |
| 3,728,470 | 4/1973 | Maier | 220/3.92 |
| 3,767,151 | 10/1973 | Seal et al. | 174/58 X |
| 3,784,042 | 1/1974 | Hadfield et al. | 220/3.92 X |
| 3,919,458 | 11/1975 | Perrault et al. | 220/3.9 X |

FOREIGN PATENT DOCUMENTS 862,598  3/1961  United Kingdom ................ 174/58

*Primary Examiner*—Stephen Marcus

[57] ABSTRACT

An electric outlet box having a support flange projecting laterally outwardly from one side of the box is attachable to a flange of a channel-shaped metal wall stud common to dry wall construction by the support flange and suitable fasteners. A leveling screw is threaded through a threaded hole in the bottom of the box adjacent the side of the box opposite to the side from which the support flange projects. The leveling screw projects through the bottom of the box with one end thereof being inside the box and slotted, and the other end being outside the box and provided with an enlarged flat head. The leveling screw is manually adjustable by a screw driver engaged in the slotted end in order to engage the enlarged screw head with a rear wall panel supported by the metal stud behind the box and to level the box with respect to a front wall panel supported by the metal stud.

The particular arrangement of the outlet box and mounting with reference to the dry wall and metal stud constitutes part of the present disclosure.

8 Claims, 3 Drawing Figures

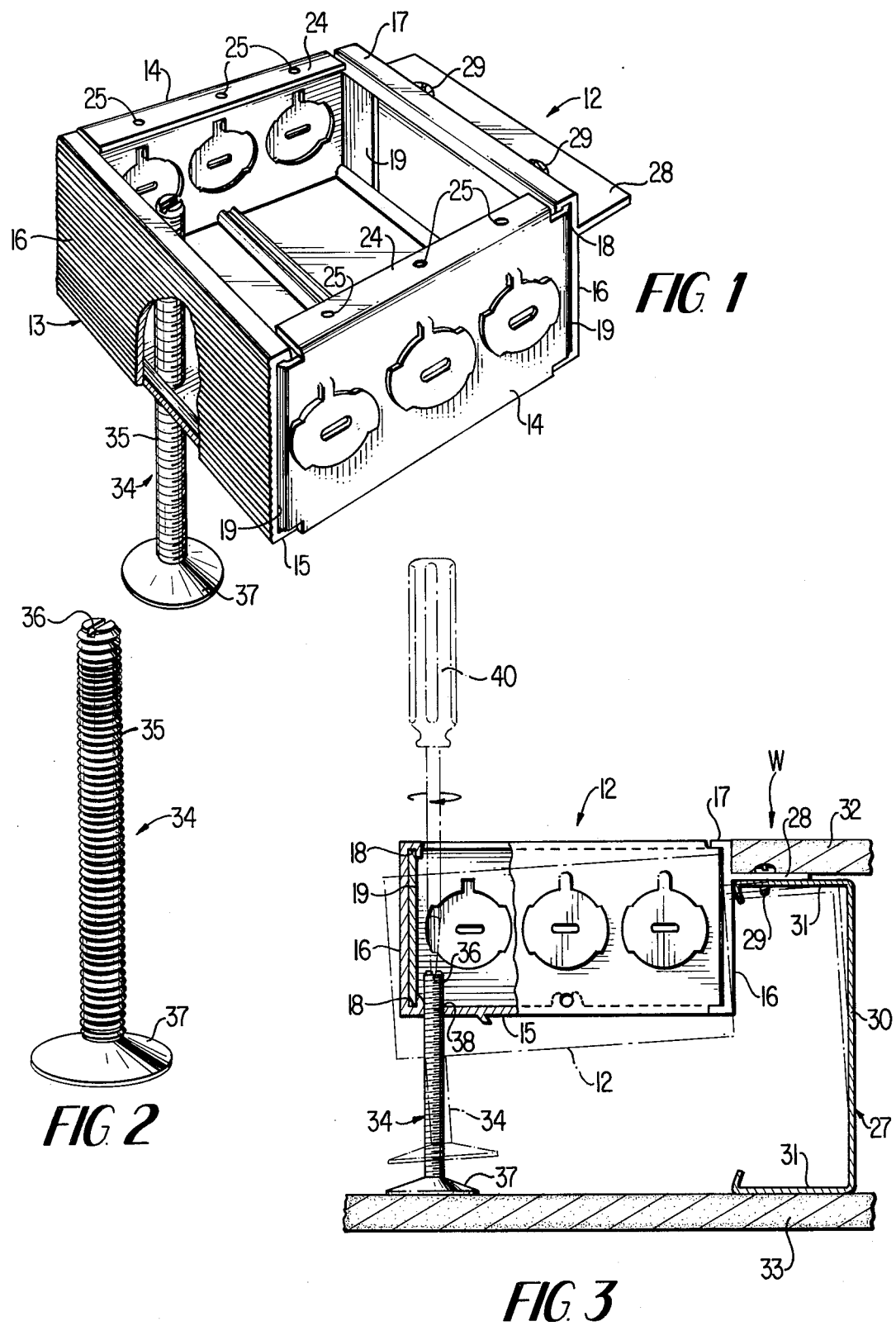

ELECTRICAL OUTLET BOX MOUNTING

This invention relates to an improved electrical outlet box for mounting in a hollow wall juxtaposed to a yieldable wall stud to which the outlet box is attached in cantilever manner by a mounting flange which projects outwardly from one side of the box and particularly to leveling means adjustably fastened to the box opposite the mounting flange for leveling the box and supporting the box against inward displacement relative to an opening in the hollow wall in which the box is mounted.

More specifically the invention relates to the combination of an electrical outlet box and a hollow wall, said hollow wall including front and back wall panels and a metal wall stud therebetween for supporting said front and back wall panels, an opening in said front wall panel adjacent said metal wall stud, said outlet box having a bottom wall, an open front, a pair of side walls and a single laterally projecting mounting flange extending outwardly from one only of said side walls, said outlet box being mounted in said opening with said one wall juxtaposed to said stud and with said laterally projecting mounting flange overlying said metal stud, fasteners extending through said flange and into said stud, a threaded hole in said bottom wall of said box adjacent the other of said side walls, and a leveling screw extending through said threaded hole in threaded engagement therewith, said leveling screw having a slotted end inside of said box with the slot facing said open front and a headed end outside of said box between said bottom wall of said box and said rear wall panel, said leveling screw being adjustable to engage the headed end of said screw against said rear wall panel and to give support to said box on the side of said box opposite to said mounting flange.

Still more specifically the invention relates to the above combination wherein the metal stud is channel-shaped in transverse cross-section and includes a central web which is normal to said front and rear wall panels and a pair of flanges formed integral with said central web on the same side thereof and normal thereto, one of said flanges of said channel being normally parallel to and underlying said front wall panel and the other of said flanges being normally parallel to and underlying said rear wall panel, said mounting flange of said outlet box overlying said one flange of said wall stud which underlies said front wall panel, said metal stud being yieldable permitting displacement of said outlet box relative to said opening when said leveling screw is out of engagement with said rear wall panel, said leveling screw when engaged with said rear wall panel giving support to said outlet box to prevent inward displacement of said outlet box relative to said opening in said front wall when inward thrust is applied to said box.

BACKGROUND OF THE INVENTION

The outlet box of this invention is an improvement upon the outlet box disclosed in my prior U.S. Pat. No. 3,728,470 issued Apr. 17, 1973. The outlet box disclosed in my U.S. Pat. No. 3,728,470 is formed from extruded metal stock and includes a bottom wall, a pair of side walls, and a mounting flange projecting outwardly from one of the side walls by which the outlet box is attached to a wall stud. When the wall stud is of wood or other rigid material, the outlet box may be attached to the wall stud by locating the box with one of its side walls juxtaposed to the stud and with the mounting flange overlying the stud, and by passing fasteners through the mounting flange into the stud. As long as the stud to which the outlet box is attached is rigid, the outlet box will not move under the normal pressure applied by an electrician in wiring the box. In present day buildings, the use of dry wall construction which includes the use of metal studs made of light gauge metal is common practice particularly where fire protection is required. When an outlet box is fastened to the light gauge metal stud, if not properly supported by some type backup support, it may move when pressure is applied by pressing an electrical attachment plug into a receptacle or from the pressure of operating a switch. Therefore some sort of backup support is required to keep the box from moving out of place. There are several methods in use by which electricians provide backup support for an electrical outlet box which is secured to a light gauge metal stud. One method is to fill the space between the back of the outlet box and the sheet rock wall panel behind the box with a block. This method is time consuming and costly. Sometimes the block used falls out of place.

Another method is disclosed in U.S. Pat. No. 3,767,151 issued to Glendon E. Seal and Willis R. Arford, on Oct. 23, 1973 and entitled Electric Wiring Box Positioner. The method disclosed by Seal and Arford includes the use of a bracket which has a straight portion having an open hook at one end and a perpendicular flange at its other end. The hook portion of the bracket is hooked over the open front edge of the side of the outlet box opposite the supporting wall stud so that the straight portion of the bracket extends rearwardly alongside the outlet box and engages the sheet rock wall panel behind the box. The bracket thus gives backup support to the outlet box on the side of the box which is opposite to the supporting metal stud. The bracket disclosed in U.S. Pat. No. 3,767,151 is of a fixed length, therefore the bracket must be of the correct length when it is applied to the outlet box to reach the sheet rock panel behind the box. This may be a disadvantage when an electrician is working on different jobs which may require brackets of different lengths. The electrician may thus be required to stock brackets of several different sizes.

It is also known to mount an outlet box in an opening in a hollow wall comprised of spaced front and rear wall panels without the use of any screw fasteners. One means to accomplish this is shown in U.S. Pat. No. 2,512,188 issued to William H. Wait and Will C. Jordan on June 20, 1950. Wait and Jordan attach a pair of outwardly projecting flanges to opposite sides of an outlet box and secure a spreader clamp in the central knockout opening in the bottom of the box. The outlet box is positioned in an opening in the front wall panel with the flanges on the opposite sides of the box engaged against the backside of the front wall panel. The spreader clamp is then adjusted outwardly of the box bottom by means of a screw toward the rear wall panel until a foot piece engages the rear wall panel. Continued outward adjustment of the spreader clamp then forces the flanges of the outlet box firmly against the back side of the front wall panel and thus secures the box in the wall opening without the use of screw fasteners.

SUMMARY OF THE INVENTION

The present invention is an improvement over the prior art in that it provides for support of an electrical outlet box in a hollow wall alongside of a metal wall stud by means of a mounting flange projecting outwardly from one side of the outlet box and fasteners extending through the flange into the metal wall stud, and additional backup support by means of a leveling screw extending through a threaded hole in the bottom of the box adjacent the side of the box opposite to the side of the box from which the mounting flange projects. One end of the leveling screw is within the box and is slotted to accept a screw driver. The other end of the leveling screw projects outwardly from the bottom of the box and has a wide flange, or flat head, attached thereto. The leveling screw is turned by a screw driver to engage the wide flange against the rear wall behind the box. Further turning of the leveling screw can bring the outlet box flush with the face of the front wall panel.

BRIEF DESCRIPTION OF THE DRAWING

With the foregoing more important objects and features in view and such other objects and features which may become apparent as this specification proceeds, the invention will be understood from the following description taken in conjunction with the accompanying drawing in which like characters of reference are used to designate like parts, and in which:

FIG. 1 is a perspective view of the electrical outlet box and leveling screw of this invention with a portion of the box broken away to expose the leveling screw;

FIG. 2 is a perspective view of the leveling screw shown in FIG. 1 removed from the outlet box;

FIG. 3 is a transverse sectional view through a portion of a hollow wall of common dry wall construction including a metal wall stud and front and rear sheet rock wall panels supported by the wall stud, and showing the electrical outlet box and leveling screw of this invention correctly mounted in solid lines. Inward displacement of the outlet box resulting from the capability of the metal wall stud to flex and the improper position of the leveling screw is indicated by phantom lines.

Referring now to the accompanying drawing in detail, the electrical outlet box designated generally by the numeral 12 in FIG. 1 consists of a box body 13 and a pair of box ends 14. The box body 13 is formed of extruded metal, such as aluminum or aluminum alloy, and includes a bottom wall 15 and a pair of side walls 16. The top and opposite ends of the body 13 are open when the body is extruded. The extruded box body 13 is formed integrally at the inside of the side walls 16 with protrusions defining opposing channels 18. Each of the box ends 14 is provided at its opposite side edges with a pair of keeper members or flanges 19 which are inturned from the plane of the box and are slidably inserted into the channels 18 at each end of the box where they are frictionally returned in the manner described in my aforesaid U.S. Pat. No. 3,728,470.

The box ends 14 are equipped at their upper edges with integral, inturned flanges 24 apertured, as at 25, so that a switch, an outlet receptacle, or the like, may be installed in the assembled box.

The assembled box 12 may be mounted at one side of a supporting wall stud 27, as seen in FIG. 3 for which purpose one of the side walls 16 of the box body 13 is formed integrally with a laterally projecting mounting flange 28. This flange overlies the stud 27 and is apertured to receive fasteners such as screws 29 whereby to secure the entire box to the stud.

The electrical outlet box so far described in like the outlet box described in my aforesaid Patent 3,728,470.

The stud 27 (see FIG. 3), commonly used in dry wall type construction, is made of light gauge, channel-shaped metal stock which includes a central web portion 30 and a pair of parallel end flanges 31,31 extending from the central web on the same side and normal thereto.

The usual dry wall generally indicated by the letter W is hollow and includes a front wall panel 32 and a rear wall panel 33 secured on opposite sides of the wall stud 27. The panels 32 and 33 are of sheet rock, composition board, or other material commonly used in wall construction. The electrical outlet box 12 is mounted juxtaposed to the wall stud 27 with the mounting flange 28 overlying the flange 31 of the wall stud adjacent the front wall panel 32. Either of the panels 32 or 33 may be designated the front wall panel depending in which direction the open top 17 of the outlet box faces. The wall panel remote from the open top of the box is designated the rear wall panel for purpose of the description, and the wall panel adjacent the open top is designated the front wall panel.

To give back up support to the outlet box 12 and to prevent the outlet box from being displace inwardly from the front wall panel, a leveling screw designated generally 34 is provided. The leveling screw 34 includes a threaded shank 35 having a slot 36 cut in one end for accepting the blade of a screw driver and a flat head 37 at the other end which is normal to the shank. A threaded hole 38 extends through the bottom 15 of the electrical outlet box adjacent to the side of the box which is opposite to the side 16 to which the mounting flange 28 is attached. The leveling screw 34 is threadedly engaged in the threaded hole 38 with the flat head 37 outside of the box and the slotted end 36 inside of the box. In order to level the box, an electrician will engage a screw driver 40 in the slotted end 36 of the leveling screw through the open top of the box and turn the screw in the manner shown in FIG. 3 until the flat head 37 engages the rear wall panel 33. The electrician continues to turn the screw 34 until the outlet box is lifted to a position where the open top 17 of the box is flush with the outer surface of the front wall panel 32. When so positioned, the electrical outlet box 12 is supported on opposite sides of the box by the mounting flange 28 and the leveling screw 34. The outlet box 12 is thus securely held in the hollow wall W against inward displacement from the front wall panel.

While in the foregoing there has been described and shown a preferred embodiment of the invention, various modifications and equivalents may be resorted to within the spirit and scope of the invention as claimed.

What is claimed is:

1. An electrical outlet box for mounting in an opening in the front panel of a hollow wall having a yieldable wall stud and front and back wall panels supported on opposite sides of said stud, said outlet box comprising a bottom wall, a pair of opposite side walls and an open front, a single laterally projecting mounting flange means extending from one only of said side walls for securing said box to said stud with said open front facing outwardly through the opening in the front panel, a threaded hole in said bottom wall of said box adjacent the other of said side walls, and leveling means for adjusting the level of the box by moving said other side of said box relative to said one side of said box when said one side is secured to said stud by its mounting flange, said leveling means comprising a leveling screw extending through said threaded hole in threaded engagement therewith, said leveling screw being adjustable inwardly and outwardly of said box to engage the back wall panel and give support to said box adjacent the side of said box opposite the side from which the mounting flange projects.

2. The electrical outlet box according to claim 1 wherein said leveling screw includes a threaded stem having a pair of opposite ends, one end being slotted and facing toward the open front of said box, the other end projecting outwardly from said bottom wall on the opposite side of said bottom wall from said slotted end, and an enlarged flat head on said other end normal to said stem.

3. The electrical outlet box according to claim 1 wherein said mounting flange is formed integrally with and extends longitudinally on the outer surface of said one side wall from which it projects, said flange being apertured to receive fasteners for securing the box to the wall stud of said hollow wall.

4. The electrical outlet box according to claim 3 wherein said flange is spaced from said open end by a distance to accommodate the thickness of a front wall panel.

5. The electrical outlet box according to claim 3 wherein said bottom, said pair of side walls and said outwardly projecting flange are integrally formed from extruded stock material.

6. The combination of an electrical outlet box and a hollow wall, said hollow wall including front and back wall panels and a yieldable metal wall stud therebetween for supporting said front and back wall panels, an opening in said front wall panel adjacent said metal wall stud, said outlet box having a bottom wall, an open front, a pair of side walls and a single laterally projecting mounting flange extending outwardly from one only of said side walls, said outlet box being mounted in said opening with said one wall juxtaposed to said stud and with said laterally projecting mounting flange overlying said metal stud, fasteners extending through said flange and into said stud, a threaded hole in said bottom wall of said box adjacent the other of said side walls, and leveling means for adjusting the level of said box by moving the other side of said box relative to said one side of said box which is juxtaposed to said stud and secured to said stud by said fasteners extending through said mounting flange, said leveling means comprising a leveling screw extending through said threaded hole in threaded engagement therewith, said leveling screw having a slotted end inside of said box with the slot facing said open front and a headed end outside of said box between said bottom wall of said box and said rear wall panel, said leveling screw being adjustable inwardly and outwardly of said box to engage the headed end of said screw against said rear wall panel and to give support to said box on the side of said box opposite to said mounting flange.

7. The combination according to claim 6 wherein said leveling screw is adjusted to engage said rear wall panel and to bring the open front of said box into parallelism with said front wall panel.

8. The combination according to claim 6 wherein said metal stud is channel-shaped in transverse cross-section and includes a central web which is normal to said front and rear wall panels and a pair of flanges formed integral with said central web on the same side thereof and normal thereto, one of said flanges of said channel being normally parallel to and underlying said front wall panel and the other of said flanges being normally parallel to and underlying said rear wall panel, said mounting flange of said outlet box overlying said one flange of said wall stud which underlies said front wall panel, said metal stud being yieldable permitting displacement of said outlet box relative to said opening when said leveling screw is out of engagement with said rear wall panel, said leveling screw when engaged with said rear wall panel giving support to said outlet box to prevent inward displacement of said outlet box relative to said opening in said front wall when inward thrust is applied to said box.

* * * * *